United States Patent
Tilkens

[11] 3,877,539
[45] Apr. 15, 1975

[54] MOTORCYCLE SHOCK ABSORBING REAR FORK SUSPENSION

[75] Inventor: Lucien Tilkens, Brustem, Belgium

[73] Assignee: Yamaha Hatsudoki Kabushiki Kaisha, Iwata-shi, Shizuoka-ken, Japan

[22] Filed: Apr. 3, 1973

[21] Appl. No.: 347,475

[30] Foreign Application Priority Data
Apr. 5, 1972    Belgium .............................. 115959

[52] U.S. Cl. .................. 180/32; 180/35; 267/65 R; 280/275; 280/284
[51] Int. Cl. ..................... B62d 61/02; B62k 19/00
[58] Field of Search ........ 280/284, 283; 180/32, 35; 267/65 R

[56]    References Cited
UNITED STATES PATENTS

| | | | |
|---|---|---|---|
| 644,787 | 3/1900 | Williams | 280/284 |
| 644,957 | 3/1900 | Williams | 280/284 |
| 696,001 | 3/1902 | Bendix | 180/32 |
| 973,217 | 10/1910 | Sager | 280/284 |
| 1,071,892 | 9/1913 | Diepenhorst et al. | 280/284 |
| 2,500,659 | 3/1950 | Burwell | 180/32 |
| 3,024,860 | 3/1962 | Nicolai | 180/32 |
| 3,269,480 | 8/1966 | Kirby | 280/284 |

FOREIGN PATENTS OR APPLICATIONS

| | | | |
|---|---|---|---|
| 438,800 | 8/1948 | Italy | 180/32 |
| 110,272 | 10/1917 | United Kingdom | 280/284 |
| 1,041,249 | 10/1953 | France | 280/284 |
| 437,594 | 7/1948 | Italy | 180/32 |
| 425,968 | 10/1947 | Italy | 280/284 |
| 1,127,761 | 12/1956 | France | 280/284 |

*Primary Examiner*—David Schonberg
*Assistant Examiner*—John P. Silverstrim
*Attorney, Agent, or Firm*—Flynn & Frishauf

[57]    ABSTRACT

A motorcycle includes a telescopic shock absorbing device comprising a spring unit and/or a telescopic damping unit wherein said shock absorbing device has one end pivoted to the upper portion of supporting means mounted on a rear fork of the motorcycle and the other end connected with a steering head, thereby to reduce shocks applied to the motorcycle.

22 Claims, 14 Drawing Figures

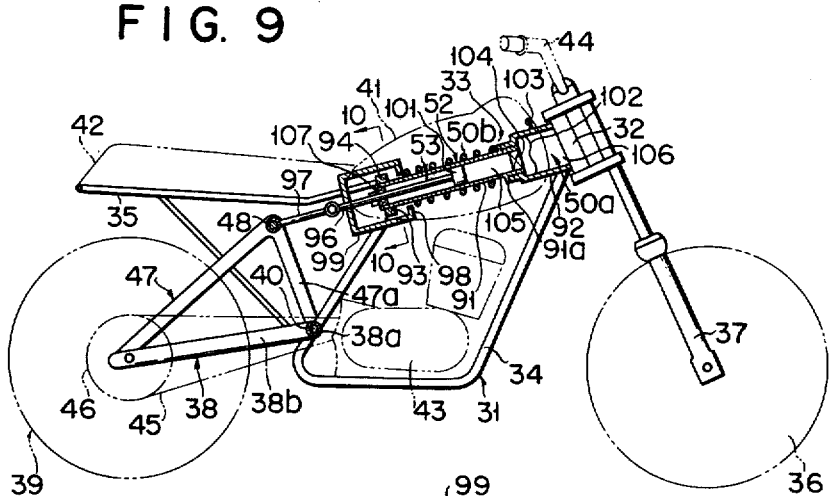
FIG. 9
FIG. 10
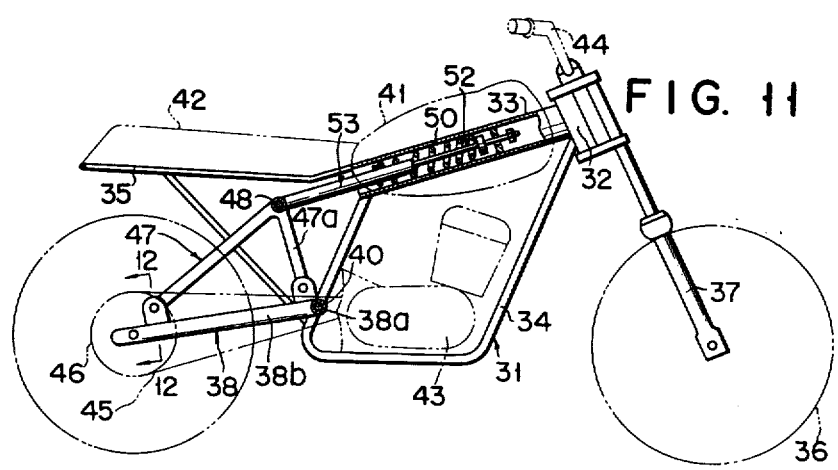
FIG. 11
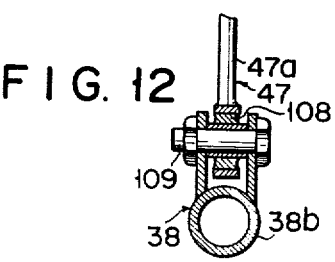
FIG. 12

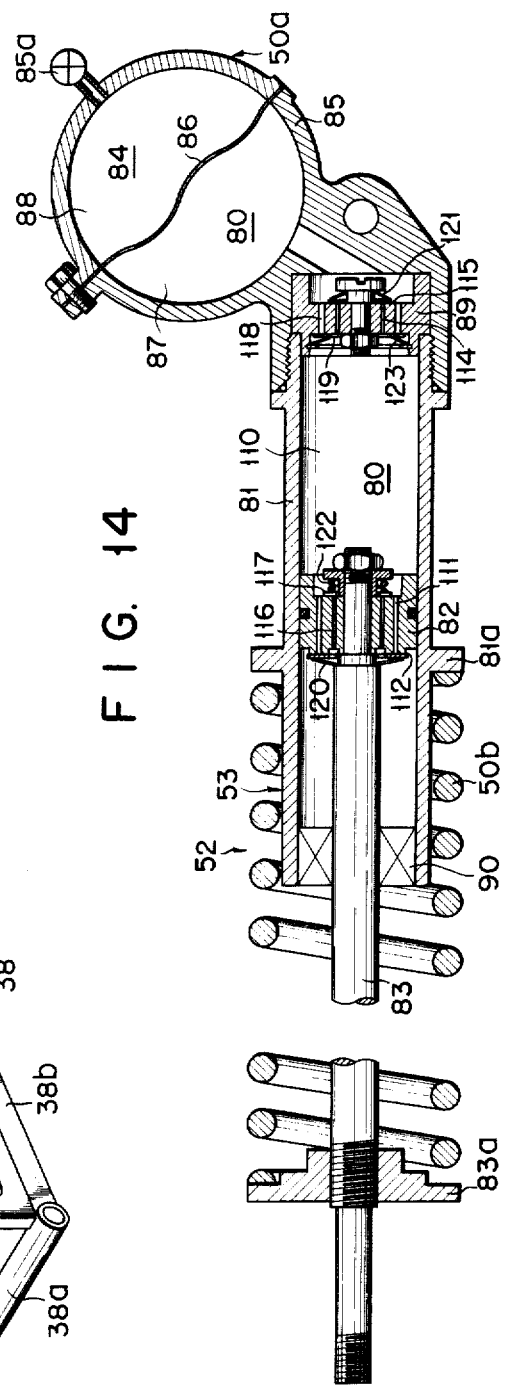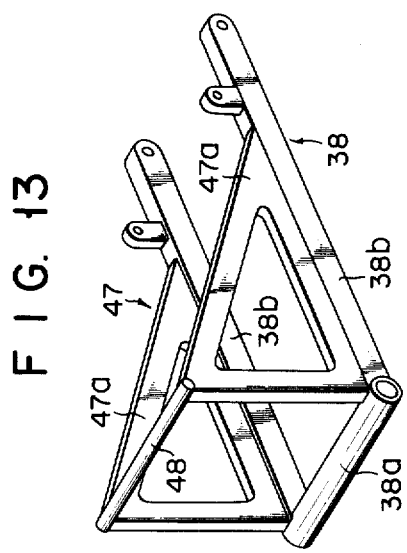

MOTORCYCLE SHOCK ABSORBING REAR FORK SUSPENSION

This invention relates to a motorcycle and more particularly to a motorcycle for the so-called "motocross" race having the rear fork hinged to the frame.

FIG. 1 is a schematic elevational view of the conventional motorcycle, showing the main frame, front fork, rear fork and rear suspension units.

Where this type of motorcycle is used in the motocross race, it is subjected to violent shocks. If a motorcycle runs over an obstacle while quickly running on a rough course, then the motorcycle as a whole will revolve about the front wheel axle. The impact causing this revolution is given through suspension units 23 having its upper end fixed to a seat support 28 and its lower end to a rear fork 22. An oil damper 25 used with the rear suspension unit 23 of an ordinary motorcycle is designed to apply a greater damping force in the direction in which said damper stretches itself than in the direction in which it contracts itself. Where, therefore, the motorcyle passes over one obstacle after another, the motorcycle strikes against the succeeding obstacle before the suspension units 23 contracting by shocks can fully regain the normal length after the motorcycle runs over the preceding obstacle. Accordingly, the shocks caused at that time are transmitted to the rear seat support 28 of the main frame 21 without being fully absorbed by the suspension units 23, causing the motorcycle to revolve about the front wheel axle. As the result, the motorcycle, particularly its rear wheel 26 often jumps off the ground, with the resultant failure to maintain a desired road-holding capacity.

With the conventional motorcycle, the suspension units 23 connected to the seat support 28 and the bifurcate rear fork 22 are fitted one on each side of the rear wheel 26. If the right and left rear suspension units 23 of the conventional motorcycle used in the "motocross" race happen to present different properties, then the rear fork 22 and main frame 21 will be subject to a torsional stress, causing the motorcycle to be reduced in running stability. Further, in addition to the fact that said rear suspension units 23 have the length naturally fixed according to the measurements of the motorcycle, immediately inside of the rear suspension units 23 of the conventional motorcycle are fitted obstructive members such as the driving chain 27 and rear wheel 26, so that the rear suspension units 23 fail to have a free shape and size. Therefore, it has been difficult to modify the properties and construction of the rear suspension units so as to adapt the motorcycle for use in the "motocross" race, for example, to provide a larger cushion stroke, increase the amount of damping oil, vary the spring constant and initial load and additionally attach a container of pressurized gas for applying higher pressure to the damping oil.

This invention provides a motorcycle wherein supporting means is provided on the rear fork pivoted to the main frame; and a single telescopic shock absorbing means for transmitting an external force applied on the rear fork to the main frame is disposed between the upper part of the supporting means and the main frame so as to extend along the tank rail of said main frame.

SUMMARY OF THE INVENTION

According to this invention, part of an external force transmitted from the rear fork to the main frame is conducted along the tank rail, thereby more prominently decreasing the arm of a moment of force leading to the revolution of a motorcycle about the front wheel axle than in the prior art construction of a motorcycle. Further, the motorcycle of this invention is provided with a single telescopic shock absorbing means so that where an external force is conducted from the rear fork to the main frame through said shock absorbing means, both rear fork and main frame are considerably saved from the torsional stress which might otherwise occur therein. Accordingly, the present motorcycle has its running stability elevated by that extent.

Said telescopic shock absorbing means is fitted along the tank rail of the main frame and allowed to take a relatively free shape and size, thereby attaining such properties and construction as render a motorcycle suitable for use in the "motocross" race, in conjunction with the modification of the properties of the oil damper and springs, the elevation of the cushion stroke and the additional provision of a container of pressurized gas.

Moreover, this invention can eliminate or miniaturize the rear suspension units projectively fitted to the rear right and left sides of the body of the prior art motorcycle. If, therefore, the present motorcycle is thrown down by mistake or accident, damage to said suspension means will be reduced.

BRIEF DESCRIPTION OF THE DRAWINGS

FIG. 9 is a schematic side elevational view similar to FIG. 2 of a motorcycle according to an eighth embodiment of the invention;

FIG. 10 is a sectional view on line 10—10 of FIG. 9;

FIG. 11 is a schematic side elevational view similar to FIG. 2 of a motorcycle according to a ninth embodiment of the invention;

FIG. 12 is a sectional view on line 12—12 of FIG. 11;

FIG. 13 is a perspective view of an integral assembly of a rear fork and supporting means used in the embodiments of FIGS. 2 and 3; and FIG. 14 is a longitudinal sectional view of the telescopic shock absorbing means of the eighth embodiment.

DETAILED DESCRIPTION OF ILLUSTRATED EMBODIMENTS

Figure 2:
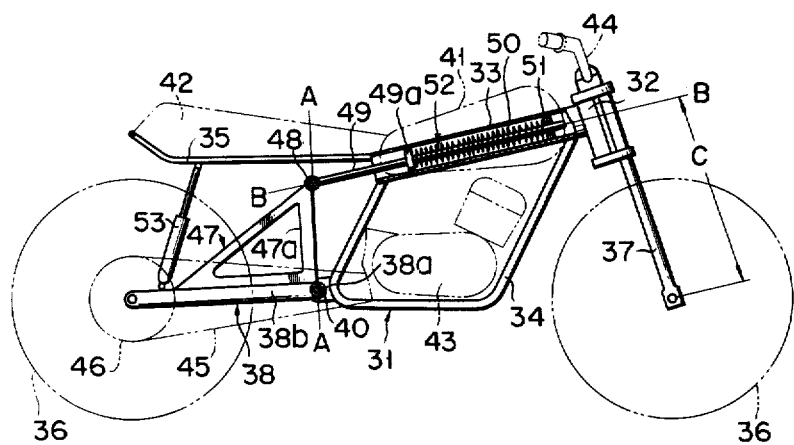
FIG. 2 is a schematic side elevational view of a motorcycle according to an embodiment of this invention, with the main section except for the neighborhood of the front fork exploded along the central plane of the body of said motorcycle.

Referring to FIG. 2, a main frame 31 comprises a steering head 32 welded thereto; a tank rail 33 extending rearward from said steering head 32; a pair of down tubes 34 fitted to the underside of said tank rail 33; and a seat support 35 extending rearward from said tank rail 33. To the steering head 32 is rotatably fitted a front fork 37 supporting a front wheel 36. To the rear lower part of the down tubes 34 is pivoted the front end portion of the bifurcate rear fork 38 by means of a pivot shaft 40. Said rear fork 38 comprises two prongs 38b paired across the body of the motorcycle. The front end portions of said prongs 38b are connected together by a connecting pipe 38a. The pivot shaft 40 penetrates the connecting pipe 38a along its length so as to swingably support the rear fork 38. The prongs 38b of the bifurcate fork 38 extend rearward along both right and left sides of a rear wheel 39 which is rotatably supported by the end portions of said prongs 38b. A fuel tank 41 presenting an inverted U-shaped cross section straddles the tank rail 33. A seat 42 is positioned on a seat support 35. Referential numerals 43 and 44 represent an engine and steering bar bandle respectively. The rear wheel 39 is driven by the engine 43 through a driving chain 45 and sprocket wheel 46. The above-mentioned arrangement is substantially the same as that of the conventional motorcycle.

According to this invention, a supporting means 47 is fixed on the bifurcate rear fork 38. The supporting means 47 comprises a pair of triangular subframes 47a whose base members are fixed to the bifurcate rear fork 38 and a shaft 48 rigidly connecting said triangular subframes 47a at the respective apices. The tank rail 33 has a hollow tubular form open at the rear end. A rod or spring supporting bracket 49 is slidably inserted into the tank rail 33 in its lengthwise direction, with the rear end of the rod 49 kept projecting from the rear end of the tank rail 33. The rod 49 is further swingably fitted to the aforesaid shaft 48. The tank rail 33 of the main frame 31 has an arbitrary cross section which, in all events, must be sufficiently large for the free insertion of a helical coil spring 50 coaxially wound about the rod 49. The forward end of the helical coil spring 50 is pressed against the surface of a lug 51 rigidly fixed to the tank rail 33 a little rearward from the steering head 32, and the rear end of the helical coil spring 50 is pressed against the surface of a flange 49a fixed to the rod 49. Understandably, the forward end of the rod 49 freely passes through an opening in the lug 51.

Referring to FIG. 2, a line A—A connecting the center of the pivot shaft 40 and that of the shaft 48 is preferred to be substantially perpendicular to the central line B—B of the helical coil spring 50. In the embodiment of FIG. 2, the rod 49 and helical coil spring 50 jointly constitute a telescopic shock absorbing means 52 disposed between the neighborhood of the steering head 32 of the tank rail 33 and the supporting means 47. At least a part of said shock absorbing means 52 is covered with the fuel tank 41. A pair of telescopic oil dampers 53 at the rear part of the motorcycle have the top pivoted to the seat support 35, and the bottom to the rear fork 38.

According to the embodiment of FIG. 2, the helical coil spring 50 absorbs a load applied to the motorcycle, and the oil damper 53 reduces the amplitude of swinging movement caused by an external force across the main frame 31 and rear fork 38.

Figure 3:
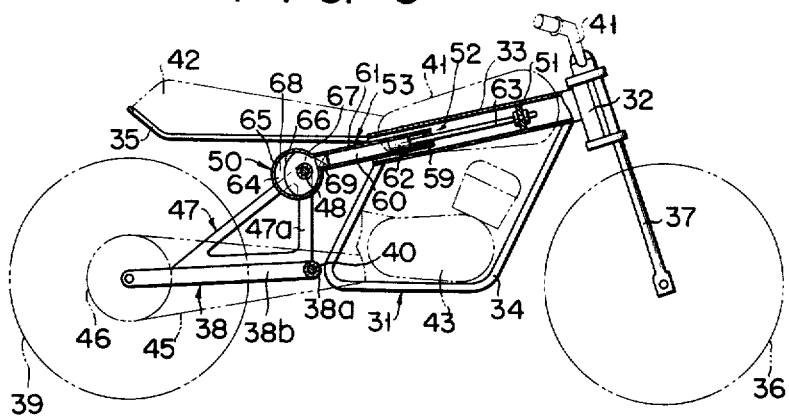
FIG. 3 is a schematic side elevational view similar to FIG. 2 of a motorcycle according to a second embodiment of the invention.

The embodiment of FIG. 3 differs from that of FIG. 2 in that the telescopic oil damper 53 is received in the tank rail 33 and a gas spring means 50 is used in place of the helical coil spring 50 of FIG. 2. The telescopic oil damper 53 of FIG. 3 comprises a cylinder 61 filled with damping oil 60, a piston 62 fitted into the cylinder 61, a piston rod 63, a gas tight container 65 filled with compressed gas 64 and a flexible membrane 66. The forward end of the piston rod 63 is swingably fitted to the lug 51. The rear part of the cylinder 61 is swingably pivoted to the upper part of the supporting means 47 by the shaft 48. The flexible membrane 66 divides the gas tight container 65 into two chambers, one chamber 67 communicating with the cylinder 61 and being filled with damping oil 60 and the other chamber 68 being filled with compressed gas 64, for example, nitrogen gas. The compressed gas 64 applies an urging force to the piston 62 through the membrane 66 and damping oil 60, said force being transmitted to the main frame 31 through the piston rod 63. Therefore, the motorcycle has its body elastically supported.

Where swinging occurs across the main frame 31 and rear fork 38, the piston 62 makes a reciprocating movement, causing the damping oil 60 in the cylinder 61 and the damping oil 60 in the chamber 67 to be moved back and forth through a foot valve assembly 69 and a piston valve assembly (not shown) provided in the piston 62, thereby quickly attenuating said swinging. Further, the damping oil 60 is pressurized by the compressed gas 64, so that no fine bubbles are created in the oil 60 due to the cavitation occurring therein even when heavy shocks are applied to the oil damper 53, thus avoiding the lowering of the damping force of the oil damper 53. In the embodiment of FIG. 3, a combination of the telescopic oil damper 53 and spring means 50 arranged and operated as described above constitutes a telescopic shock absorbing means 52.

Figure 1:
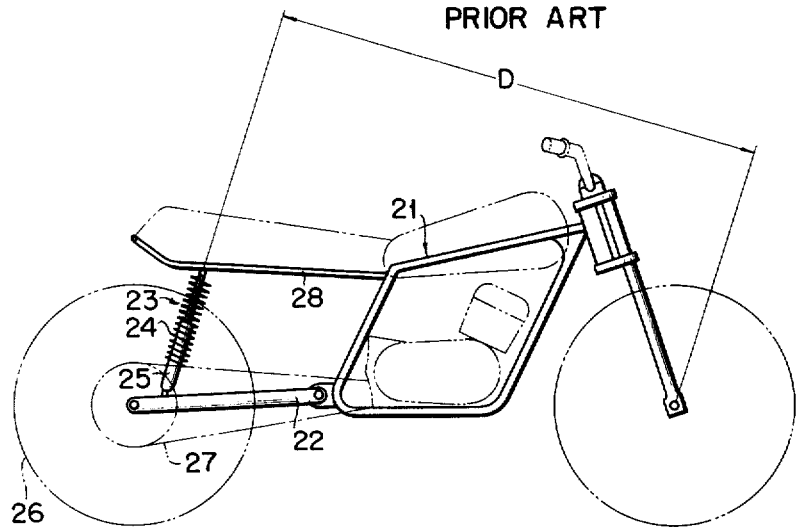
FIG. 1 is a schematic side elevational view of the conventional motorcycle, showing the main frame, front and rear forks and rear suspension units.
Figure 4:
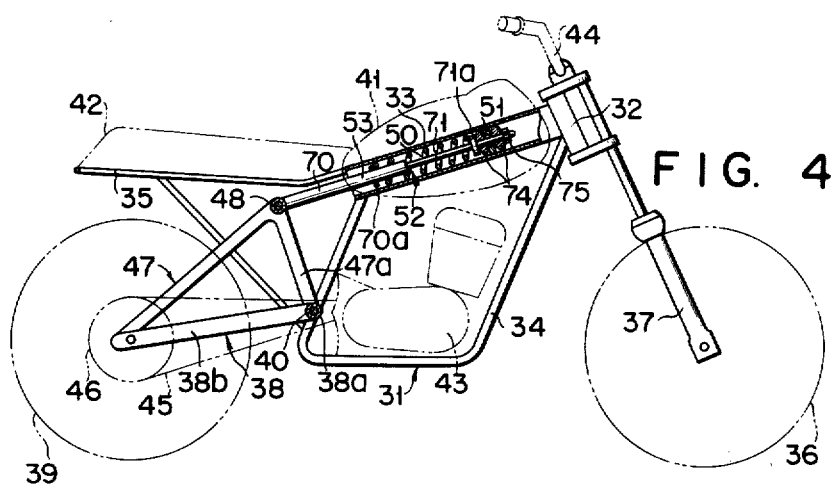
FIG. 4 is a schematic side elevational view similar to FIG. 2 of a motorcycle according to a third embodiment of the invention.

FIG. 4 represents a third embodiment of this invention wherein the telescopic shock absorbing means 52 using a helical coil spring is received in the tank rail 33. The telescopic shock absorbing means 52 comprises the telescopic oil damper 53 and helical coil spring 50 coaxially wound about the telescopic oil damper 53 along its length. The oil damper 53 includes a cylinder 70 and piston rod 71. Both ends of the helical coil spring 50 are pressed against the surfaces of the flanges 70a and 71a fixed to the cylinder 70 and piston rod 71 respectively. The rear end of the cylinder 70 is pivoted by the shaft 48 disposed at the upper part of the supporting means 47. The forward end of the piston rod 71 is elastically supported on the lug 51 fixed to the tank rail 33 by a nut 75 through a pair of buffer rubber members 74 disposed on both sides of the lug 51. In the embodiment of FIG. 4, violent shocks caused when the telescopic shock absorbing means 52 makes a full stroke are absorbed by said buffer rubber members 74, thereby decreasing a force applied to the main frame 31, and reducing the jumping of the motorcycle, particularly, its rear wheel 39 and torsional stresses occuring in the main frame 31 and rear fork 38. The above-mentioned shock absorbing effect becomes more prominent in the motorcycle of this invention wherein the length C (FIG. 2) of the arm of a moment of force applied to the shock absorbing means 52 is considerably smaller than the length D (FIG. 1) of the arm of a moment of force applied to the suspension units 23 of the known motorcycle.

Throughout the embodiments of FIGS. 4 to 12, the triangular subframes 47a mounted on the rear fork 38 lack the base portion and actually take an italic L-shape.

Figure 5:
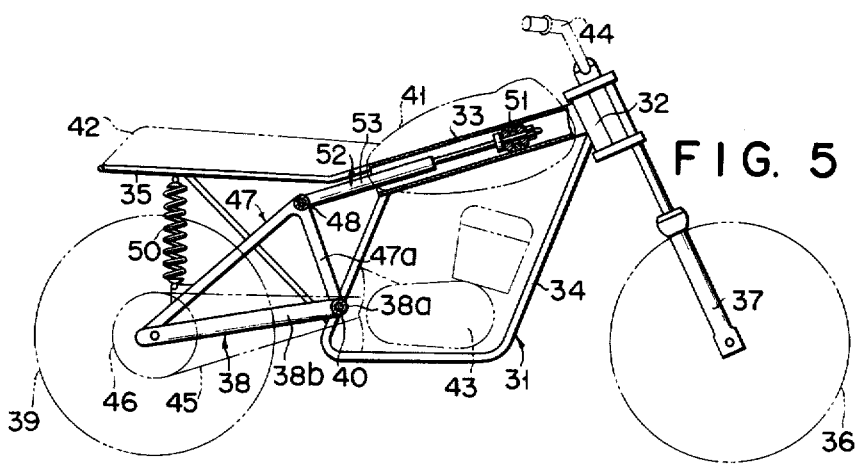
FIG. 5 is a schematic side elevational view similar to FIG. 2 of a motorcycle according to a fourth embodiment of the invention.

Referring to the embodiment of FIG. 5, the telescopic oil damper 53 constituting the telescopic shock absorbing means 52 is positioned between the shaft 48 disposed at the upper part of the supporting means 47 and the lug 51 provided on the main frame 31. The helical coil springs 50 are disposed between the rear part of the rear fork 38 and the seat support 35. The oil damper 53 is fitted in substantially the same manner as in the embodiment of FIG. 4, and the helical coil springs 50 are fitted in substantially the same manner as in the known motorcycle of FIG. 1.

Figure 6:
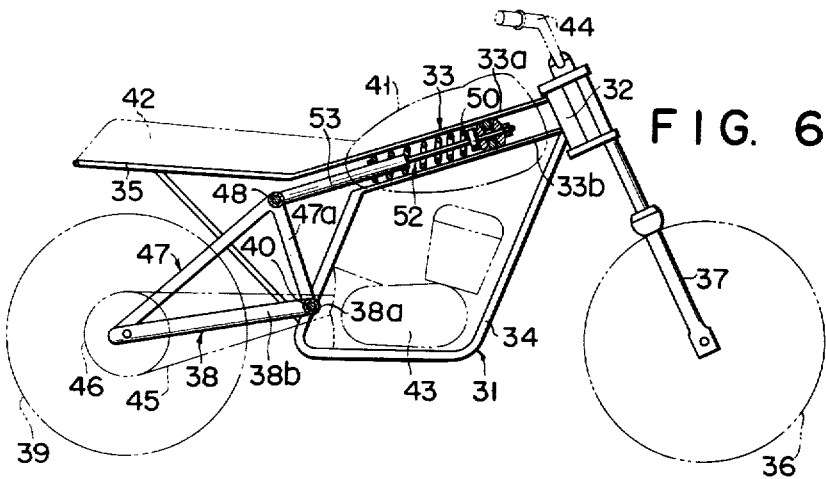
FIG. 6 is a schematic side elevational view similar to FIG. 2 of a motorcycle according to a fifth embodiment of the invention.
Figure 7:
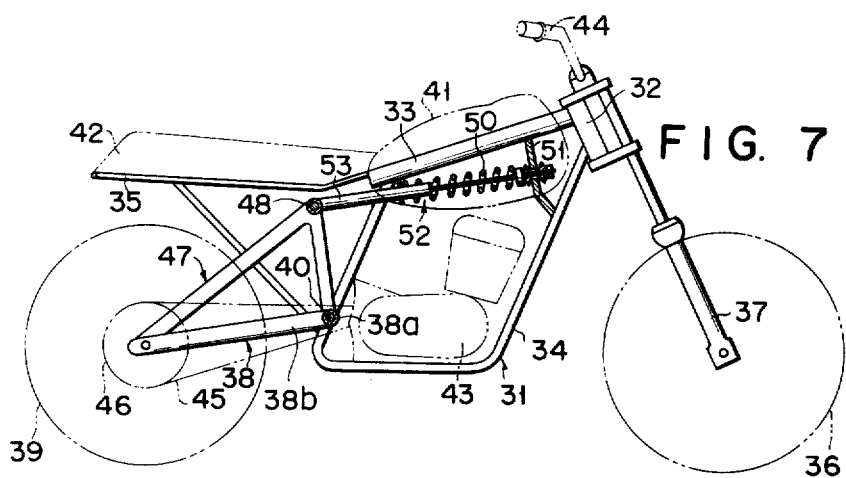
FIG. 7 is a schematic side elevational view similar to FIG. 2 of a motorcycle according to a sixth embodiment of the invention.

In the embodiments of FIGS. 6 and 7, the telescopic shock absorbing means 52 is of the same type and also fitted in the same manner as in the embodiment of FIG. 4.

In the embodiments of FIGS. 6 and 7, however, the main frame 31 is constructed in a different manner from that of FIG. 4. Namely, in the embodiment of FIG. 6, the tank rail 33 comprises an upper member 33a and lower member 33b which are spatially disposed in parallel relationship. The telescopic shock absorbing means 52 consisting of the telescopic oil damper 53 and helical coil spring 50 is positioned between said upper and lower members 33a and 33b so as to extend in the lengthwise direction thereof. In the embodiment of FIG. 7, the telescopic shock absorbing means 52 of the same arrangement as that of FIG. 6 extends along the underside of the tank rail 33 in a state slightly inclined therefrom. Further, the lug 51 supporting the forward end of the telescopic shock absorbing means 52 is welded across the tank rail 33 and down tubes 34.

In the embodiment of FIG. 7, the telescopic shock absorbing means 52 is not inserted into the tank rail 33, but has at least a part of it covered with the fuel tank 41.

Figure 8:
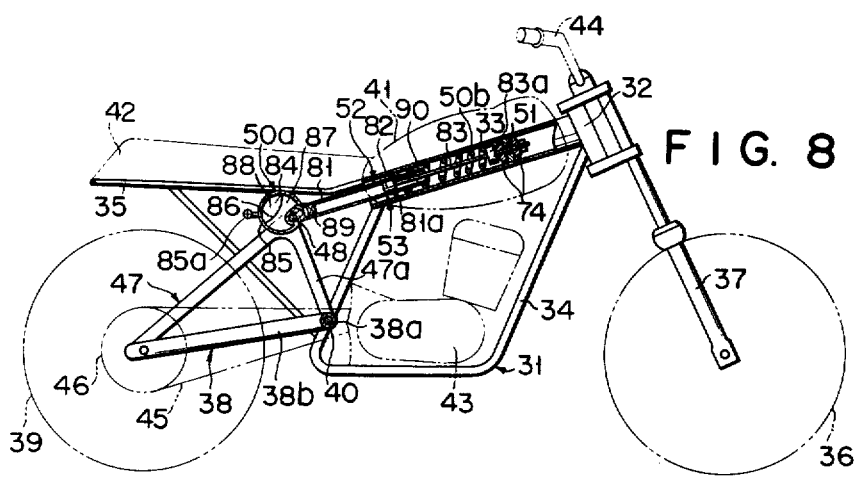
FIG. 8 is a schematic side elevational view similar to FIG. 2 of a motorcycle according to a seventh embodiment of the invention.

The embodiment of FIG. 8 resembles that of FIG. 4, excepting that the telescopic oil damper 53 has a different construction from that of FIG. 4 (as detailed in FIG. 14) and the motorcycle has its body elastically supported by the gas spring 50a and helical coil spring 50b. As seen from FIG. 14, the telescopic oil damper 53 of the embodiment of FIG. 8 contains a cylinder 81 filled with damping oil 80, a piston 82 fitted into the cylinder 81, a piston rod 83, a gas tight container 85 filled with compressed gas 84, flexible member 86, a sealing member 90 received in the cylinder 81 and a foot valve assembly 89. The forward end of the piston rod 83 is elastically fitted to the lug 51 rigidly fixed to the tank rail 33 through a pair of buffer rubber members 74 disposed on both sides of the lug 51. The rear part of the cylinder 81 is pivoted to the upper part of the supporting means 47 by the shaft 48. The telescopic oil damper 53 has its outer periphery wound with a helical coil spring 50b along its length. Both ends of said helical coil spring 50b are pressed against the surface of flanges 81a and 83a fixed to the cylinder 81 and piston rod 83 respectively. The flexible membrane 86 divides the gas tight container 85 into two chambers, one chamber 87 communicating with the cylinder 81 through a foot valve assembly 89 and being filled with the damping oil 80 and the other chamber 88 being filled with compressed gas, for example, nitrogen gas. The compressed gas 84 applies an urging force to the piston 82 through the flexible membrane 86 and damping oil 80. This force is transmitted to the main frame 31 through the piston rod 83 so as to elastically support the motorcycle body in cooperation with the helical coil spring 50b. The damping oil 80 is pressurized by the compressed gas 84, so that, even when heavy shocks are applied to the oil damper 53, no fine bubbles are created in the oil 60 due to the cavitation occurring therein, thus preventing the damping force of the oil damper 53 from lowering. The valve 85a is used to fill gas in the chamber 88. Where the telescopic damper 53 contracts itself, one part of the damping oil in the first chamber 110 of the cylinder 81 is conducted to the second chamber 113 thereof through the passage 111 of the piston 82 and a valve 112. The other part of the damping oil in the first chamber 110 is transferred to the chamber 87 of the gas tight container 85 through the passage 114 of the foot valve assembly 89 and a valve 115. Where the telescopic oil damper 53 stretches itself, the damping oil 80 in the second chamber 113 is transported to the first chamber 110 through a passage 116 and a valve 117. The damping oil 80 in the chamber 87 is also shifted to the first chamber 110 through a passage 118 and a valve 119. Springs 120, 121, 122 and 123 press corresponding valves 112, 115, 117 and 119 to the corresponding valve seats. A damping force derived from the compression stroke arises mainly when the clamping oil 80 is conducted through the passage 114, while a damping force resulting from the extension stroke is generated mainly when said damping oil 80 flows through the passage 116.

In the embodiment represented jointly by FIGS. 9 and 10, the tank rail 33 comprises the cylinder 91 and gas tight container 92 of the telescopic oil damper 53. The gas tight container 92 is welded to the steering head 32. The cylinder 91 has its forward end screwed to the gas tight container 92 and its rear end fixed to the rear part of the down tubes 34 by brackets 93 and 94 and bolt-nut assemblies 95. A piston rod 96 projects from the rear end of the cylinder 91 and is connected to the shaft 48 through a link 97. The outer periphery of the rear part of the cylinder 91 is fitted with a ring 98 slidable in the axial direction of the cylinder 91. Said ring 98 is fixed to the rear part of the piston rod 96 through a member 99. The cylinder 91 has its outer periphery coaxially wound with the helical coil spring 50b along its length. Both ends of said spring 50b press the ring 98 and the flange 91a of the cylinder 91 respectively. In the embodiment of FIG. 9, the motorcycle has its body elastically supported by the gas spring 50a and helical coil spring 50b as in the embodiment of FIG. 8. Referential numeral 101 represents a piston, 102 a flexible membrane, 103 a valve, 104 a foot valve assembly, 105 damping oil, 106 compressed gas and 107 a sealing member.

The embodiment denoted jointly by FIGS. 11 and 12 has substantially the same arrangement as the embodiment of FIG. 4, excepting that the supporting member 47 is fitted in a different manner from FIG. 4. In the embodiment of FIGS. 11 and 12, the supporting member 47 is fitted to the rear fork 38 by damper rubber members 108 and bolt-nut assemblies 109. Where, therefore, the rear wheel is subjected to violent shocks, said damper rubber members 108 absorb part of the shocks, performing a buffer action.

It will be noted that this invention is not limited to the foregoing embodiments. Namely, for the object of the invention, the tank rail need not always be a type provided with a fuel tank, but may be formed of any other member substantially resembling said tank rail in respect of contruction.

What is claimed is:

1. A motorcycle comprising:
  a. a main frame having a steering head and a tank rail extending rearward from said steering head;
  b. a rear fork having a forward end portion pivoted to the rear lower portion of said main frame;
  c. a fuel tank having an inverted generally U-shaped cross-section and straddling said tank rail;
  d. a pair of triangular subframes;
  e. said rear fork being connected to the base sides of said pair of triangular subframes; and
  f. hydraulic shock absorbing means extending along said tank rail so as to be mostly covered with said fuel tank, said shock absorbing means comprising:
    i. an oil damper comprising a cylinder filled with damping oil and a piston rod telescopically projecting from one end of said cylinder, one of said cylinder and said piston rod being connected to said main frame at a portion a little rearward of said steering head and the other of said cylinder and piston rod being pivotally mounted to the upper portions of said pair of triangular subframes; and
    ii. a gas tight container, the interior of which is divided by a movable member into two chambers, one of said chambers communicating with the interior of said cylinder and the other chamber being filled with compressed gas exerting pressure on the damping oil, thereby causing said compressed gas to urge said rear fork downward.

2. A motorcycle as claimed in claim 1 wherein said movable member comprises a flexible membrane.

3. A motorcycle as claimed in claim 2 wherein said gas tight container is mounted on the other end of said cylinder.

4. A motorcycle as claimed in claim 3 wherein said gas tight container is fixed to said cylinder, said one of said cylinder and piston rod comprises said piston rod and said other of said cylinder and piston rod comprises said cylinder.

5. A motorcycle as claimed in claim 2 wherein said gas tight container is fixed to said cylinder.

6. A motorcycle as claimed in claim 1 wherein said gas tight container is mounted on the other end of said cylinder.

7. A motorcycle as claimed in claim 6 wherein said gas tight container is fixed to said cylinder.

8. A motorcycle as claimed in claim 1 wherein said gas tight container is fixed to said cylinder.

9. A motorcycle as claimed in claim 1 further including a helical coil spring having ends secured to said main frame and said rear fork respectively, whereby said helical coil spring and compressed gas cooperate to urge said rear fork downward.

10. A motorcycle as claimed in claim 9 wherein said movable member comprises a flexible membrane.

11. A motorcycle as claimed in claim 10 wherein said gas tight container is mounted on the other end of said cylinder.

12. A motorcycle as claimed in claim 11 wherein said gas tight container is fixed to said cylinder, said one of said cylinder and piston rod comprises said piston rod and said other of said cylinder and piston rod comprises said cylinder.

13. A motorcycle as claimed in claim 9 wherein said gas tight container is mounted on the other end of said cylinder.

14. A motorcycle as claimed in claim 13 wherein said gas tight container is fixed to said cylinder.

15. A motorcycle as claimed in claim 9 wherein said helical coil spring is wound around said telescopic oil damper, the ends of said helical coil spring being secured to said cylinder and said piston rod respectively.

16. A motorcycle as claimed in claim 15 wherein said movable member comprises a flexible membrane.

17. A motorcycle as claimed in claim 16 wherein said gas tight container is mounted on the other end of said cylinder.

18. A motorcycle as claimed in claim 17 wherein said gas tight container is fixed to said cylinder, said one of said cylinder and piston rod comprises said piston rod and said other of said cylinder and piston rod comprises said cylinder.

19. A motorcycle as claimed in claim 15 wherein said gas tight container is mounted on the other end of said cylinder.

20. A motorcycle as claimed in claim 19 wherein said gas tight container is fixed to said cylinder.

21. A motorcycle comprising:
  a. a main frame having a steering head and a tank rail extending rearward from said steering head;
  b. a rear fork having the forward end portion pivoted to the rear lower portion of said main frame;
  c. a fuel tank having an inverted generally U-shaped cross-section and straddling said tank rail;
  d. supporting means mounted on said rear fork including a pair of triangular subframes, the base sides of which are connected to said rear fork and the upper portions of which are joined together by means of a shaft;
  e. a lug rigidly fixed to said tank rail at a portion a little rearward of said steering head;
  f. hydraulic shock absorbing means extending along said tank rail so as to be mostly covered with said fuel tank, said shock absorbing means comprising:
    i. a telescopic oil damper comprising a cylinder filled with damping oil and a piston rod telescopically projecting from one end of said cylinder, one of said cylinder and piston rod being elastically connected to said lug by means of a pair of buffer rubber members disposed on both sides of said lug, and the other of said cylinder and piston rod being pivoted to said shaft of said supporting means;
    ii. a helical coil spring wound around said telescopic oil damper, the ends of said helical coil spring being secured to said cylinder and piston rod respectively; and
    iii. a gas tight container mounted on an extreme end of said cylinder, the interior of said container being divided by a flexible membrane into two chambers, one of which communicates with the interior of said cylinder and the other of which is filled with compressed gas exerting pressure on the damping oil in said cylinder, whereby said helical coil spring and compressed gas cooperate to urge said rear fork downward.

22. A motorcycle comprising:
a. a main frame having a steering head and a tank rail extending rearward from said steering head;
b. a rear fork having the forward end portion pivoted to the rear lower portion of said main frame;
c. a fuel tank having an inverted generally U-shaped cross-section and straddling said tank rail;
d. supporting means mounted on said rear fork including a pair of triangular subframes, the base sides of which are connected to said rear fork and the upper portions of which are joined together by means of a shaft;
e. a lug rigidly fixed to said tank rail at a portion a little rearward of said steering head; and
f. rod-shaped telescopic hydraulic shock absorber means extending along said tank rail so as to be mostly covered with said fuel tank, said shock absorbing means comprising:
i. a telescopic oil damper having a cylinder filled with damping oil and a piston rod projecting from one end of said cylinder, the forward end of said piston rod being elastically connected to said lug by means of a pair of buffer rubber members disposed on both sides of said lug, and the rear end of said cylinder being pivoted to said shaft of said supporting means;
ii. a helical coil spring wound around said telescopic oil damper, the ends of said helical coil spring being secured to said cylinder and piston rod respectively; and
iii. a gas tight container mounted on the rear end of said cylinder, the interior of said container being divided by a flexible membrane into two chambers, one of which communicates with the interior of said cylinder and the other of which is filled with compressed gas exerting pressure to the damping oil in said cylinder, whereby said helical coil spring and compressed gas cooperate to urge said rear fork downward.

* * * * *